(12) United States Patent
Capote et al.

(10) Patent No.: US 6,948,766 B1
(45) Date of Patent: Sep. 27, 2005

(54) PROTECTOR FOR AUTOMOBILES

(76) Inventors: Ileana Capote, 6481 W. 12 La., Hialeah, FL (US) 33012; Juvenal Rivero, 1707 W. 58 St., Hialeah, FL (US) 33012

( * ) Notice: Subject to any disclaimer, the term of this patent is extended or adjusted under 35 U.S.C. 154(b) by 170 days.

(21) Appl. No.: 10/729,288

(22) Filed: Dec. 8, 2003

(51) Int. Cl.$^7$ .................................................. B60J 7/00
(52) U.S. Cl. ..................................... 296/152; 296/99.1
(58) Field of Search ........................ 296/152, 139–141, 296/99.1, 146.1; 160/370.22; 135/88.05, 135/88.07

(56) References Cited

U.S. PATENT DOCUMENTS

| | | | | |
|---|---|---|---|---|
| 1,425,954 A | * | 8/1922 | Fischer | ...................... 296/99.1 |
| 1,704,994 A | * | 3/1929 | Shallenberger | ............. 196/152 |
| 2,532,989 A | * | 12/1950 | Biondi | ........................ 160/92 |
| 5,476,302 A | | 12/1995 | Ronci | ........................ 296/99.1 |
| 6,044,856 A | * | 4/2000 | Cano | ....................... 135/88.07 |
| 6,341,811 B1 | * | 1/2002 | Schoelkopf | ................. 296/154 |
| 2003/0192581 A1 | * | 10/2003 | Chang | ..................... 135/88.07 |

FOREIGN PATENT DOCUMENTS

| | | | | |
|---|---|---|---|---|
| JP | 59-53227 | * | 3/1984 | ................ 296/99.1 |
| JP | 63-20216 | * | 1/1988 | ................ 296/99.1 |

* cited by examiner

Primary Examiner—Stephen Gordon
(74) Attorney, Agent, or Firm—Jesus Sanchelima; Albert Bordas

(57) ABSTRACT

A protector for vehicles' door openings with hingedly mounted doors to cover an adjacent area and protect is from rain and snow. The protector includes at least one frustro-conical roller member with a rollable sheet. The rollable sheet has two straight lateral ends and two curved lateral ends. Male and female hook members for removably mounting one of the straight lateral ends to the upper end of the door so that when the door is swung open the rollable sheet is unrolled substantially covering the area adjacent to the door's opening. Each frustro-conical roller member includes spring bias assembly for urging the rolling back of the rollable sheet after being rolled out. When at least two roller members and at least two rollable sheets are contiguous, the rollabe sheets include a zipper member for releasably joining the contiguous curved lateral ends.

4 Claims, 3 Drawing Sheets

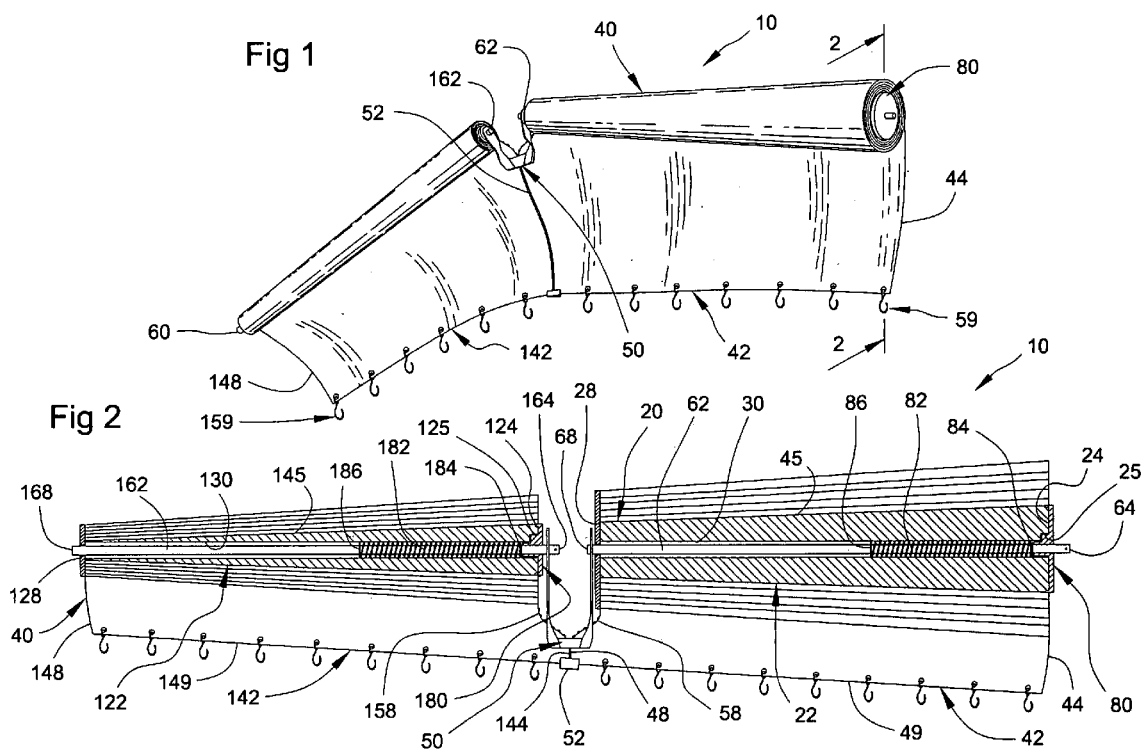

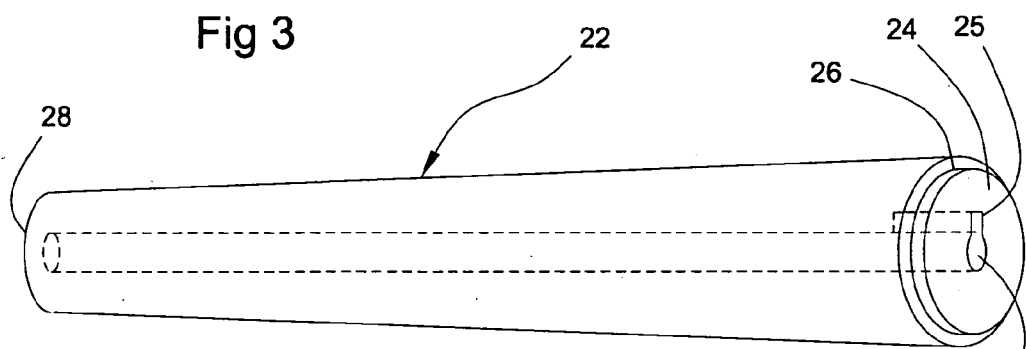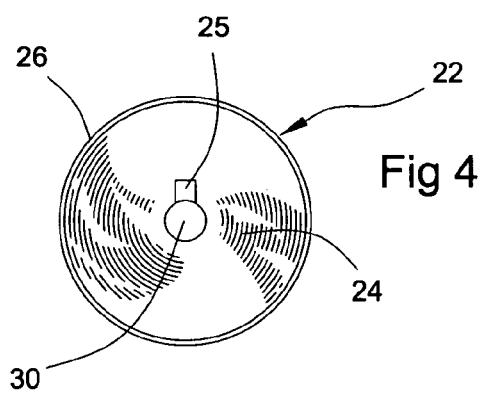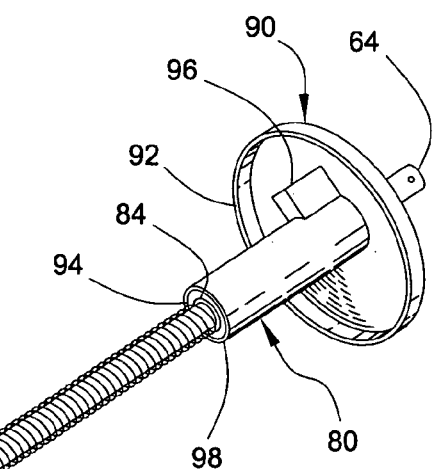

PROTECTOR FOR AUTOMOBILES

BACKGROUND OF THE INVENTION

1. Field of the Invention

The present invention relates to a protector for automobiles, and more particularly, to a protector to be used with vehicles doors to protect a user from the elements (rain, snow, etc.) as he or she opens the door.

2. Description of the Related Art

Several designs for protectors for automobile have been developed in the past. None of them, however, includes the use of frustro-conical members that reel in a protective sheet taking into consideration the differences in linear distension of the sheet as a formation of the separation from the hinges' point.

Applicant believes that the closest reference corresponds to U.S. Pat. No. 5,476,302 issued to Michael B. Ronci on Dec. 19, 1995 for a cover for car door. Ronci's patented invention includes a cover for an automobile that is attached at one end to a (straight) roller, and at the other end to attachment points at the top of the door. Ronci's patent mentions that when the door is closed, the fabric is rolled unto the roller. However, there is no disclosure as to how the fabric is rolled unto the roller and what mechanism makes the invention work. It is clear Ronci's patented invention does not take into consideration the different magnitudes of distension or advancement of the fabric as the distance from the pivoting axis varies.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a protector for automobiles that protects a user from the elements (rain, snow, etc.) when the door is opened and the user gets ready to get off the vehicle.

It is another object of this invention to provide a protector for vehicles that can be adjusted to almost any door size.

It is still another object of the present invention to provide a protector for automobiles with a self-roller and unrolling mechanism.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of the protector for automobiles object of the present application.

FIG. 2 shows a cross-section view taken from FIG. 1 along lines 2—2 showing configuration of the preferred embodiment for the protector object of the present application.

FIG. 3 is a front isometric view of the preferred embodiment for the frustro-conical roller sections.

FIG. 4 illustrates a side elevational view of the frustro-conical roller section represented in FIG. 3, showing the peripheral channel and notch.

FIG. 5 shows a front isometric view for the rolling-unrolling mechanism used with the present invention, mounted to the axle, showing the bushing member with its peripheral ridge, the rib and the spring.

DETAILED DESCRIPTION OF THE PREFERRED EMBODIMENT

Figure 7:
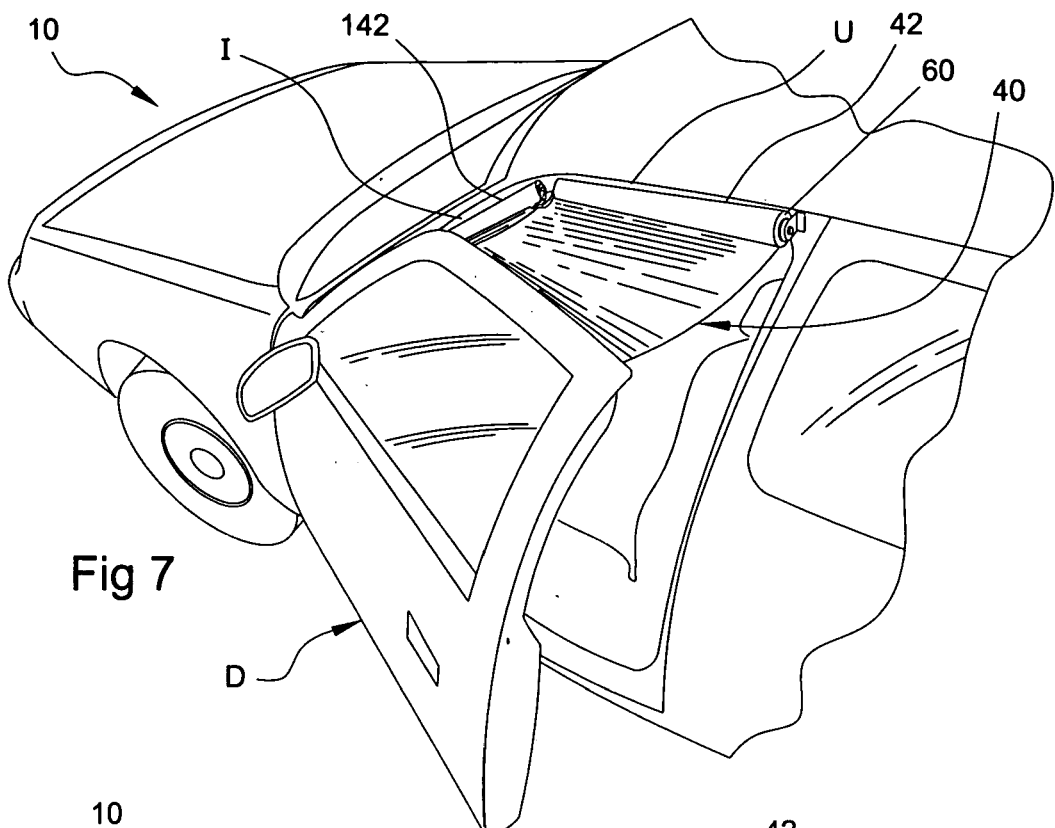
FIG. 7 is a representation of an isometric view of the open protector for automobiles mounted to an automobile door.

Referring now to the drawings, where the present invention is generally referred to with numeral 10, it can be observed that it basically includes two-sectional frustro-conical roller assembly 20 with rollable sheet 40, as seen in FIGS. 1 and 2.

Figure 6:
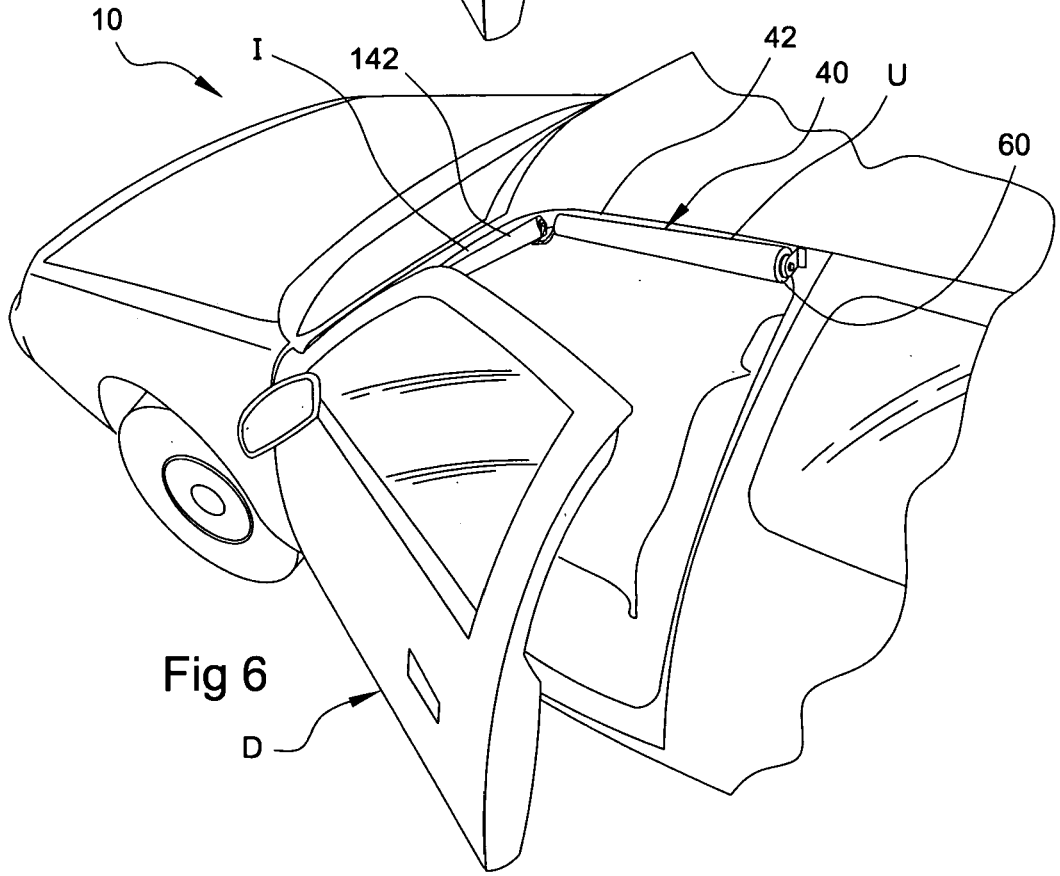
FIG. 6 illustrates an isometric view of the rolled protector for automobiles mounted to an automobile door opening.

Depending on the characteristics and dimensions of the vehicle's door to be protected, frustro-conical roller assembly 20 can include on or more frustro-conical roller members to substantially follow the upper contour of the door. In this application the door shown in FIGS. 6 and 7 is used. For a completely square door only one roller number is needed. The one shown requires the use of two roller members since one portion is substantially horizontal and the other one is slanted. The dimensions of the frustro-conical members are selected so that the different linear advance of flexible rollable sheet 40 is taken into consideration as the distance form the pivoting axis of the door varies. In other words closer to this axis the distance that rollable sheet 40 has to travel is less than at the distal end of the door D.

Frustro-conical roller assembly 20 includes, in the preferred embodiment, frustro-conical roller members 22 and 122. As best seen in the cross-section represented in FIG. 2, roller member 22 has a larger diameter at the end 24. When it is installed, as seen in FIGS. 6 and 7, end 24 is positioned to correspond with the distal end of door D. In the preferred embodiment, member 22 includes central through opening 30 that receives axle member 62. The dimensions of member 22 are selected to take into consideration the longer advancement of rollable sheet section 42 towards end 24 with respect to end 28. Axle member 62 is rigidly supported to horizontal upper frame portion U of a car door opening. Spring member 82 is also housed within opening 30 to bias roller member 22. Spring member 82 is anchored to cylinder 98 of rolling-unrolling supporting mechanism 80 at one end 84 and to axle 62 at the other end 86. As roller member 22 is rotated by pulling rollable sheet section 42, torsion energy is stored in spring member 82. This energy is later used to pull in rollable sheet section 42.

Similarly, frustro-conical roller member 122 operates with spring member 182 to store the necessary torsion energy to retrieve rollable sheet section 142. The dimensions of member 122 are selected to take into consideration the longer advancement of rollable sheet section 142 towards lateral end 124 with respect to lateral end 128. Again, axle member 162 is rigidly supported to upper inner portion I of a car door opening.

Rollable sheet 40 includes rollable sheet sections 42 and 142. Rollable sheet section 42 (and 142) includes lateral ends 44, 45, 48 and 49 (and 144, 145, 148, and 149). Lateral end 45 (and 145) is straight and affixed to frustro-conical roller member 22 (and 122). Lateral end 49 (and 149) is straight. Lateral ends 44 and 48 (and 144 and 148) are cooperatively curved. Lateral end 44 (and 144) extends for a predetermined longer distance than lateral end 48 (and 148).

Mounting assembly 59 removably mounts lateral end 49 to upper frame portion U of car door D. When a user open car door D, rollable sheet 42 is unrolled substantially covering the area adjacent to the door's opening. Mounting assembly 159 removably mounts lateral end 149 to the upper inner portion I of car door D. When a user opens car door D, rollable sheet 142 is unrolled substantially covering the area adjacent to the door's opening. Mounting assemblies 59 and 159 may be implemented with hooks and rings or with any male and female hook members such as VELCRO. VELCRO is a trademark of VELCRO Industries B.V., a limited liability company of Netherlands.

In the preferred embodiment, rollable sheets 42 and 142 are contiguous and include zipper assembly 50 for releasably joining lateral end 48 of rollable sheet 42 with lateral end 144 of contiguous rollable sheet 142. Lateral ends 48 and 144 may also include, in another preferred embodiment, male and female hook means 58 and 158, respectively. FIG. 2 best shows slider assembly 50 for joining lateral end 48 and 144.

Rollable sheet sections 42 and 142 may also be joined with other means such as a ZIPLOC or VELCRO. ZIPLOC is a trademark of S.C. Johnson Home Storage, Inc. a Delaware corporation.

Axle 60 has two sections including axle members 62 and 162 with the same shape and dimensions. Axle member 62 includes ends 64 and 68, and is fixedly mounted to horizontal upper frame portion U of a car door opening. Axle member 62 passes through central opening 30 of horizontal frustro-conical roller section 22. Axle member 162 includes ends 164 and 168, fixedly mounted to upper inner portion I of the car door opening. Axle member 162 passes through central opening 130 of frustro-conical roller section 122.

Spring member 82 (and 182) is mounted to end 24 (and 124) of frustro-conical roller member 20 (and 120) and to axle member 62 (and 162), as best seen in FIG. 5. Spring member 82 (and 182) urges rollable sheet member 42 (and 142) to roll back after being rolled out. Rolling-unrolling supporting mechanism 80 (and 180) includes, in the preferred embodiment, spring member 82 (and 182) and bushing member 90 (and 190). Bushing member 90 (and 190) includes peripheral ridge 92 (and 192), central through opening 94 (and 194), rib 96 (and 196) and cylinder 98 (and 198). Spring member 82 (and 182) is mounted to axle member 62 (and 162). Spring member 82 (and 182) includes ends 84 and 86 (184 and 186). End 84 (and 184) is fixed to a predetermined point of axle member 62 (and 162). End 86 (and 186) is fixed to cylinder 98 (and 198) of bushing member 90 (and 190). Axle member 62 (and 162) passes through the center of spring member 82 (and 182) and through opening 94 (and 194). Peripheral ridge 92 (and 192) removable engages in notch 25 (and 125) of frustro-conical roller section 22 (and 122). Rib 96 (and 196) is removably mounted to peripheral channel 26 (and 126). When the user pulls outer lateral end 49 (and 149) of rollable sheet section 42 (and 142), roller section 22 (and 122), fixed to bushing member 90 (and 190), rotates. Then, spring 82 (and 182) is torqued. The weight of the car door is greater than the spring torque, so rollable sheet section 42 (and 142) will be rolled up only when the car door is closed or rollable sheet section 42 (and 142) is removed from car door D.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A protector for vehicles' door openings with hingedly mounted doors with proximate and distal ends that pivot substantially about a vertical axis, comprising:
   A) at least two frustro-conical roller members each having first and second ends, said first ends having a diameter of a predetermined dimension that is larger than the diameter of said second ends, said first end of one of said roller members being mounted on an upper frame portion for a door of a vehicle that coincides with said distal end and each other roller member is mounted coaxially and contiguously to another roller member having a first end coincide with a distal end, said roller members including spring bias means;
   B) at least two rollable sheets each having first, second, third and fourth lateral ends, said first lateral end being straight and affixed to one of said at least two frustro-conical roller members, said second lateral end is straight, and said third and fourth lateral ends being cooperatively curved and said third lateral end extending for a predetermined longer distance than said fourth lateral end and further including means for releasably joining said third lateral ends with said fourth lateral ends of contiguous rollable sheets, said spring bias means urging the rolling back of said rollable sheets after being rolled out; and
   C) means for removably mounting said second lateral end to an upper end of said door so that when said door is swung open said at least two rollable sheets are unrolled substantially covering the area adjacent to said door's opening.

2. The protector set forth in claim 1 wherein said means for releasably joining said third and fourth lateral ends of said contiguous rollable sheets includes zipper means.

3. The protector set forth in claim 1 wherein said means for releasably joining said third and fourth lateral ends of said contiguous rollable sheets includes male and female hook means.

4. The protector set forth in claim 1 wherein said means for removably mounting said second lateral end includes male and female hook means.

* * * * *